United States Patent [19]
Findlay

[11] 3,806,784
[45] Apr. 23, 1974

[54] A.C. POWER CONTROL UNIT
[75] Inventor: James Findlay, Motherwell, England
[73] Assignee: Howden Supertherm Limited, Hanworth, Middlesex, England
[22] Filed: Dec. 4, 1972
[21] Appl. No.: 312,214

[30] Foreign Application Priority Data
Dec. 3, 1971 Great Britain............... 56130/71

[52] U.S. Cl................... 318/230, 323/18, 323/24
[51] Int. Cl. ........................................ H02p 5/40
[58] Field of Search ........ 323/18, 24; 219/497, 498; 318/227, 230, 231

[56] References Cited
UNITED STATES PATENTS
| | | | |
|---|---|---|---|
| 3,377,547 | 4/1968 | Ohlson | 219/498 |
| 3,611,086 | 1/1970 | Mokrytzki | 318/230 |
| 3,662,247 | 5/1972 | Schieman | 318/230 |
| 3,694,718 | 9/1972 | Graf et al. | 318/230 |
| 3,703,672 | 11/1972 | Bird et al. | 318/230 |

OTHER PUBLICATIONS
Binary Rate Multiplier Controls AC Power, Wallner, January 1972, pp. 50, 51.

Primary Examiner—Gene Z. Rubinson
Attorney, Agent, or Firm—Mason, Fenwick & Lawrence

[57] ABSTRACT

A method of controlling and a control unit for a system fed by an a.c. power through semiconductor power switches wherein a square wave is used to control firing pulses for the power switches, the markspace ratio of the square wave being representative of an actual and a desired system parameter.

4 Claims, 9 Drawing Figures

FIG.6   70%        30%

FIRING PULSES TO SEMICONDUCTOR SWITCHES

|←——— 140 m.sec ———→|←— 60 m.sec —→|
         POWER ON              POWER OFF

A.C. POWER CONTROL UNIT

This invention relates to a method of and a solid state control unit for controlling a system fed by an a.c. power supply. For example, the method and the control unit may be used to achieve variable temperature control of heating systems and variable speed control of a.c. motors, in particular induction motors.

According to the present invention there is provided a method of controlling a system fed by an a.c. power supply the said power supply and in which each step of the staircase waveform has the same period as the power supply;

generating a control signal being the sum of a signal representative of a desired system parameter and a signal representative of the difference between the desired system parameter and an actual system parameter;

comparing the staircase waveform with the said control signal;

generating a square wave having a mark-space ratio determined by the said comparison of the staircase waveform and the control signal;

controlling the operation of a high frequency pulse generator with said square wave; and controlling the semiconductor power switch with the output of said high frequency pulse generator.

Preferably, said staircase waveform is derived from a reference waveform which is the a.c. power supply.

Preferably also, the number of steps of the staircase waveform is selectively variable and each step of the staircase waveform starts at the cross-over at zero volts of the said reference waveform.

Further according to the present invention there is provided a control unit for controlling a system fed by an a.c. power supply through a semiconductor switch in the power supply line, comprising a square wave generator to generate a first square wave having a known phase relationship with the power supply being controlled, a staircase waveform generator a control amplifier and a firing pulse generator wherein the staircase waveform generator and the control amplifier generate a second square wave from the said first square wave and wherein the firing pulse generator is controlled by the said second square wave to activate the said semiconductor switch.

The principle of operation of the control system according to the present invention is that the temperature of the heating system or the speed of the induction motor being controlled is altered by controlling the proportion of applied full cycles to the proportion of non-applied full cycles of the alternating voltage being applied to the heating system or motor. The proportional value of the voltage is controlled by interrupting the power supply line in such a manner as to produce a desired average value of supply voltage at the heating system or motor.

The ratio of the period during which conduction takes place to the period during which the voltage supply line is interrupted is known as the 'mark-space' ratio. By adjusting the mark-space ratio, the average value of voltage applied may be controlled by the semiconductor power switch.

Embodiments of the present invention will now be described by way of example with reference to the accompanying drawings in which:

FIGS. 3, 4, 5, 6 and 7 are waveform diagrams showing the waveforms at different parts of the control system;

Figure 1:
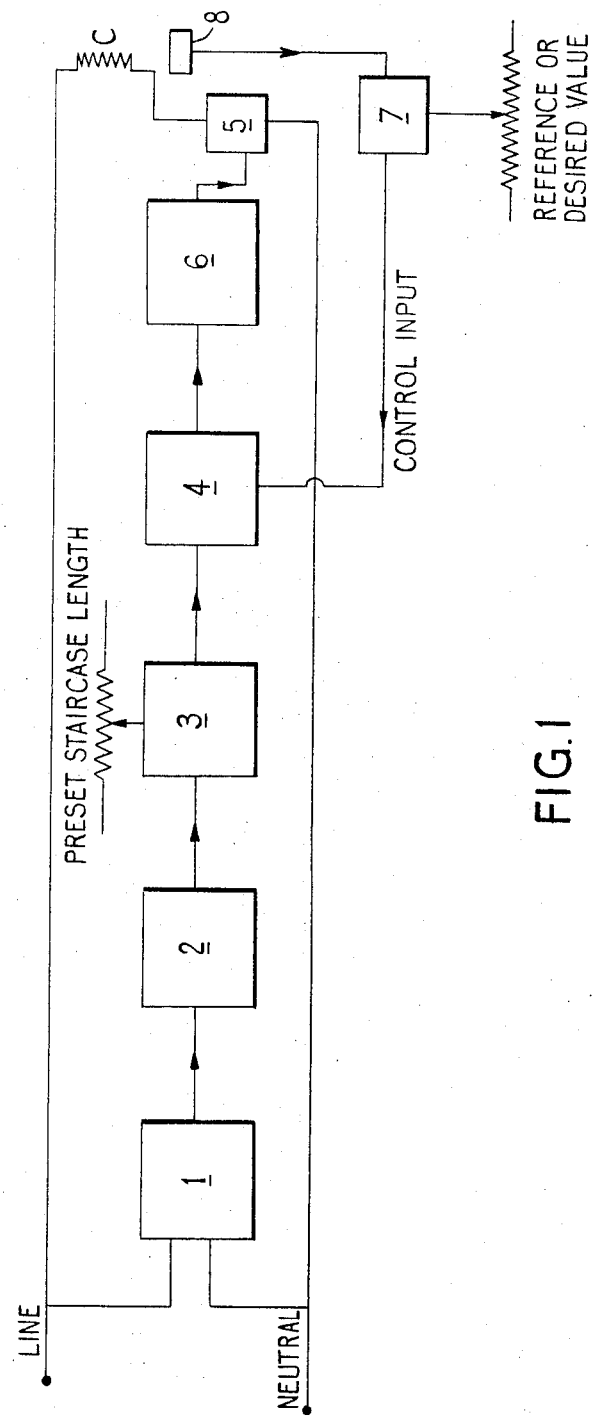
FIG. 1 shows a control system according to the present invention applied to a single phase heating system.
Figure 2:
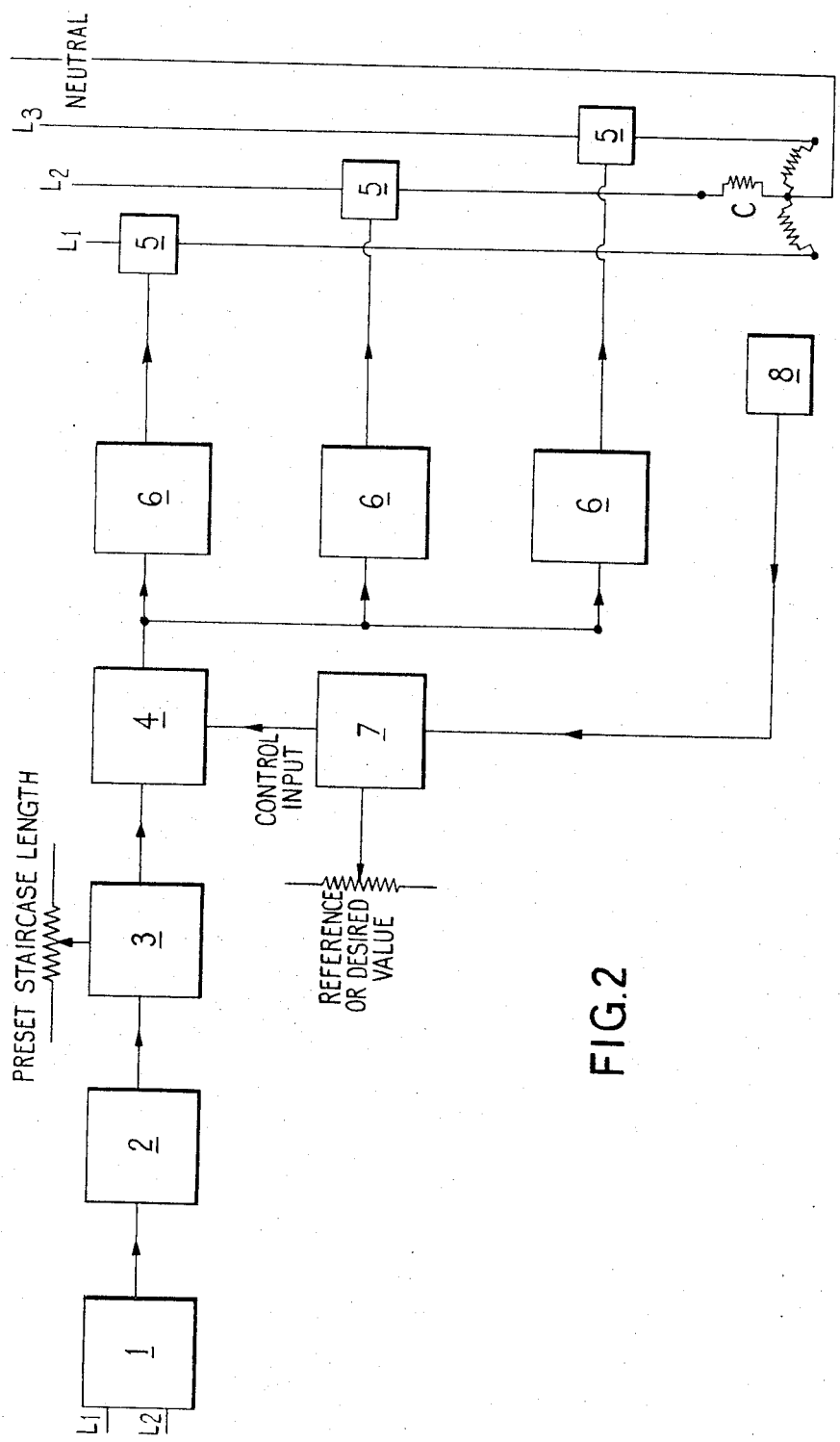
FIG. 2 shows a control system according to the present invention applied to a three phase heating system.

Referring to the drawings, a control system according to the present invention has a power supply and phase reference unit 1. The power supply may be derived from the same supply as that for a heating system C whose temperature is being controlled by the system.

Figure 3:
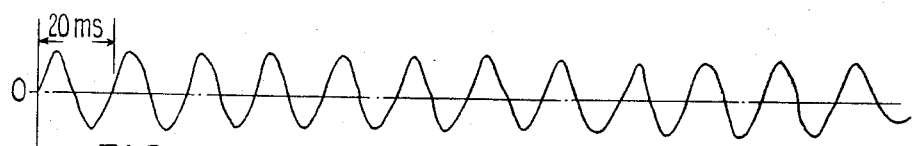
Figure 4:
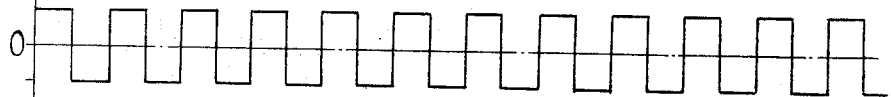

The sinusoidal output of the unit 1 is shown in FIG. 3 and this sinusoidal voltage waveform is converted by a square-wave generator 2 into the square wave shown in FIG. 4. The square-wave generator includes a zero crossover detector so that the point of origin of the square-wave generated by the square-wave generator 2 coincides with the cross-over at zero volts of the sinusoidal waveform.

Figure 5:
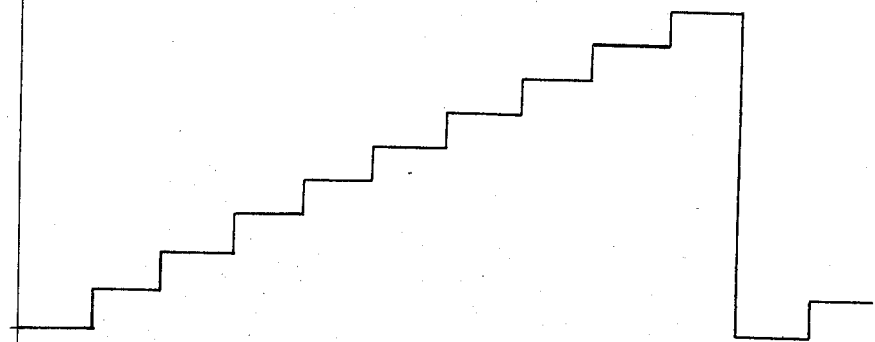

The square-wave from the square-wave generator 2 is passed to a variable-length staircase-waveform generator 3. The output of the staircase-waveform generator 3 is the staircase-waveform shown in FIG. 5. The length of the staircase-waveform is variable from two to 15 steps each step occupying 20 milliseconds when the system is used with an a.c. power supply having a frequency of 50 cycles/second. As the staircase-waveform is derived from the square-wave shown in FIG. 4, each step of the staircase waveform also coincides with the cross-over at zero volts of the sinusoidal waveform, i.e. all waveforms are synchronised with the alternating voltage supply.

A control amplifier 4 is variable mark-space control amplifier and receives as an input a demand signal which is a function of the desired temperature of the heating system and the actual temperature of the heating system. This demand signal may be derived from any analogue control unit such as a temperature sensor 8, the signal from which is first passed through difference amplifier 7. When the system is used as a speed control for a motor, the demand signal may be representative of any operating parameter of the motor, for example, air flow in the case of a fan motor, and again the signal may be derived from any analogue control unit 7,8. The demand signal is compared with the staircase-waveform to produce at the output of the amplifier 4 a square-wave whose mark-space ratio is dependent on the value of the demand signal (FIG. 6). If, for example, the demand signal is such to indicate that temperature of the heating system is too low or the motor is running too slow, the the amplifier 4 increases the mark-space ratio of the system thus increasing the temperature of the heating system or accelerating the motor.

Figure 7:
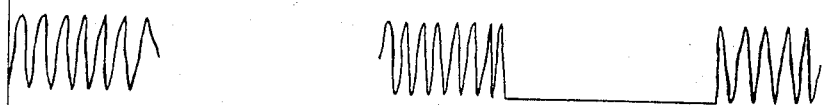
Figure 8:
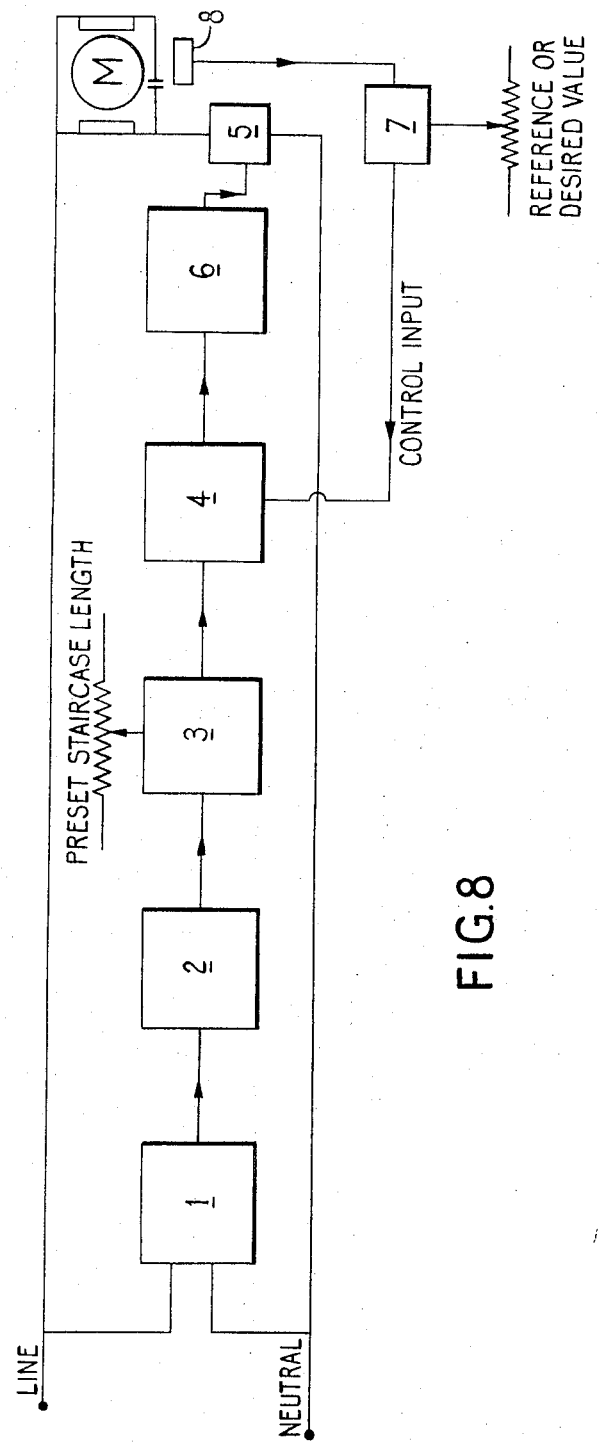
FIG. 8 shows a control system according to the present invention applied to a single phase induction motor.
Figure 9:
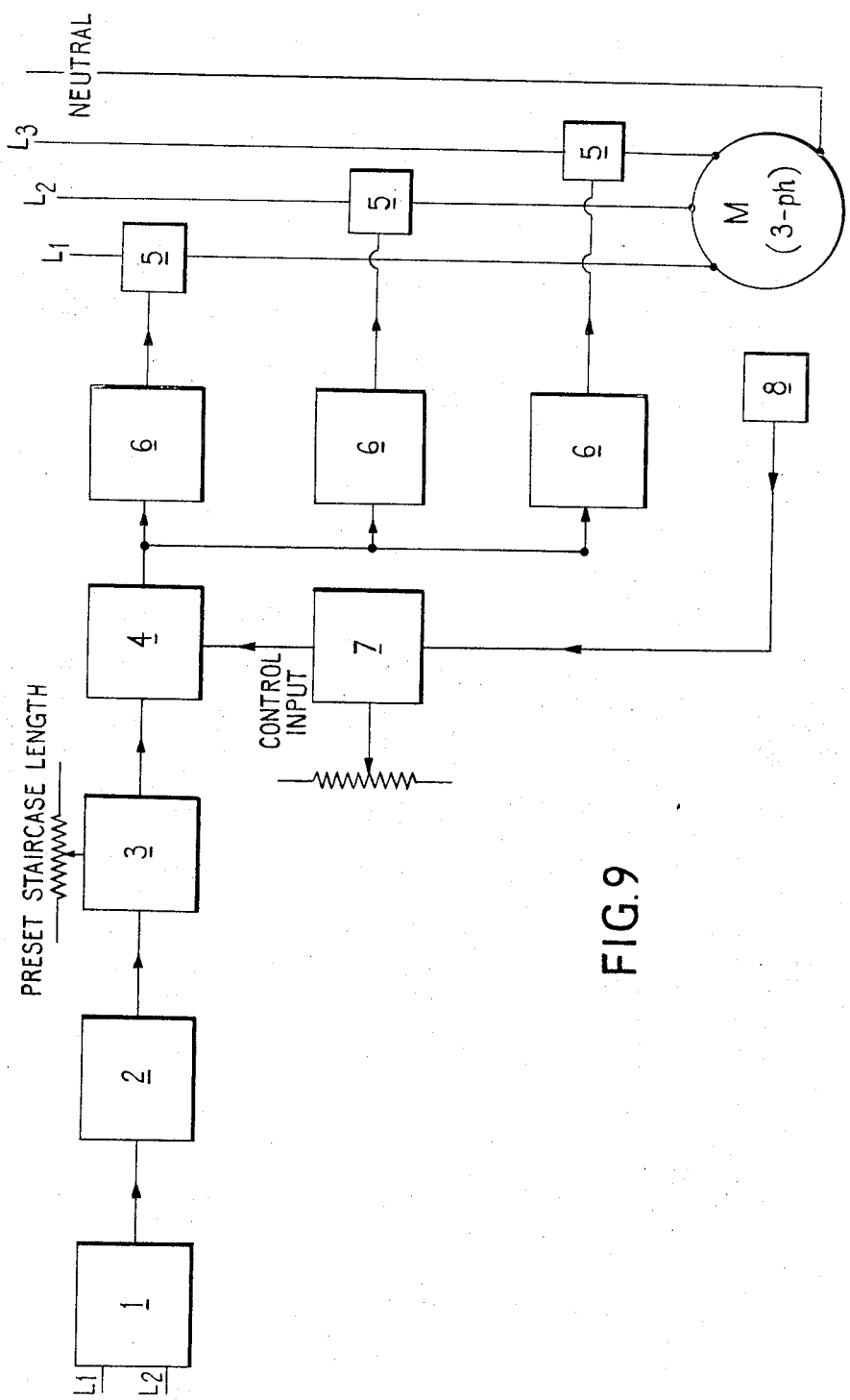
FIG. 9 shows a control system according to the present invention applied to a three phase induction motor.

Varying the temperature of the heating system or the speed of the motor is effected by altering the average value of the voltage applied. The average value of the supply voltage is controlled by interrupting the voltage supply line by semiconductor switches 5. The switches 5 are controlled by a pulse train generated by a firing pulse generator 6. The duration of the output pulse train of the generator 6 is the same as the duration of the output of the control amplifier 4 (FIG. 7). Again, the start of the pulse firing train coincides with the cross-over at zero volts of the reference waveform shown in FIG. 3.

The method of setting up the control system for automatic operation will now be described taking as an example a desired control ratio of 7 to 3.

A number of staircase steps equal to the sum of the control ratio units is pre-selected on the staircase-waveform generator 3. In this case, as the power on to power off ratio (i.e. the mark-space ratio) is 7 to 3, the number of staircase steps is 10. As the number of staircase steps is variable from two to 15 any control ratio 1:1, to 1:14 may be chosen.

The desired temperature or motor speed is set on a pre-set control on the difference amplifier 7. The heating system is switched on and the desired temperature is compared to the actual temperature or in the case of motor control, the motor is started using a starting system normal for the class of motor being used, and the desired speed is compared with the actual speed. The difference between these parameters generates a demand signal which is applied to the mark-space control amplifier 4. Initially, the mark-space ratio of the output of the amplifier 4 would be 100 percent reducing to 70 percent when the desired temperature or speed had been measured. The mark-spaced ratio of the square-wave output of the amplifier 4 would then fluctuate about 70 percent as the demands on the heating system or motor fluctuate, thus controlling the average r.m.s. value of voltage applied.

The control system of the present invention is especially suitable for heating systems used in large furnaces and for fan motor control where the high moment of inertia of the fan maintains motor speed during the time the supply voltage is disconnected from the motor.

Tests on a 3 H.P. squirrel cage motor were carried out using a speed control system according to the present invention. Throughout the range of available control ratios, no abnormal operation of the motor was experienced and no voltage spikes or radio-frequency interference was generated.

Further the control system of the present invention offers variable control of the a.c. power fed to the heating system or motor with very high power control accuracy for both resistive-reactive loads and for rotating inductive loads.

The control system hereinabove described operates at an efficiency of approximately 99 percent and can be connected directly into a three phase circuit without identifying the individual phases as it requires only one reference phase for operation.

When applied to a motor, the formulaue for calculating the output r.m.s. voltage and output power of a motor system having a control system according to the present invention are as follows:

output r.m.s. voltage $V = V_o (x/t)^{1/2}$
and output power $P = P_o (x/t)$
where
$V_o$ = maximum uncontrolled r.m.s. output voltage
$P_o$ = rated output power of motor $x$ = number of conducting cycles per unit time.
$t$ = total number of conducting cycles and non-conducting cycles per unit time.

The method and control unit hereinabove described can be applied to any system fed by an a.c. power supply and, according to another aspect of the present invention, there is provided in a heating system fed by an a.c. power supply, and having a semiconductor power switch in the power supply line, and a high-frequency firing pulse generator adapted to supply firing pulses to the semiconductor power switch, a method of achieving substantially continuously variable temperature control of the heating system, comprising repetitively generating a staircase waveform, which is related in a known manner to the phase of the power supply and in which each step has the same period as the a.c. power supply, comparing the staircase waveform with the sum of a signal representative of a desired temperature of the heating system and a signal representative of the difference between the desired temperature and the actual temperature of the heating system to generate a square wave whose mark-space ratio is determined by said comparison and controlling the operation of the high-frequency pulse generator with the said square wave.

According to yet another aspect of the present invention, there is further provided in a motor system having a motor fed by an a.c. power supply, a semi-conductor power switch in the power supply line, and a high-frequency firing pulse generator adapted to supply firing pulses to the semi-conductor power switch, a method of achieving substantially continuously variable speed control of the motor, comprising repetitively generating a staircase waveform, which is related in a known manner to the phase of the power supply and in which each step has the same period as the a.c. power supply, comparing the staircase waveform with the sum of a signal representative of a desired speed of the motor and a signal representative of the difference between the desired speed and the actual speed of the motor to generate a square wave whose mark-space ratio is determined by said comparison and controlling the operation of the high-frequency pulse generator with the said square wave.

What is claimed is:

1. A method of controlling a system fed by an A.C. power supply through a semiconductor power switch in the power line, comprising the steps of:

repetitively generating a staircase waveform, related in a known manner to the phase of the said power supply and in which each step of the staircase waveform has the same period as the power supply;

generating a control signal being the sum of a signal representative of a desired system parameter and a signal representative of the difference between the desired system parameter and an actual system parameter;

comparing the staircase waveform with the said control signal;

generating a square wave having a mark-space ratio determined by the said comparison of the staircase waveform and the control signal:

controlling the operation of a high frequency pulse generator with said square wave; and controlling the semiconductor power switch with the output of said high frequency pulse generator.

2. The method as claimed in claim 1 wherein the number of steps of the staircase waveform is selectively variable.

3. A control unit for controlling a system fed by an a.c. power supply through a semiconductor switch in the power supply line, comprising a:
   square wave generator to generate a first squarewave having a known phase relationship with the power supply being controlled;
   a staircase waveform generator for generating a staircase waveform from the said first square wave;
   a control amplifier for generating a control signal being the sum of a signal representative of a desired system parameter and a signal representative of the difference between the desired system parameter and an actual system parameter;
   a difference amplifier for comparing the staircase waveform with the said control signal to generate a second square wave; and
   a firing pulse generator for activating the said semiconductor switch, the operation of the firing pulse generator being controlled by the said second square wave.

4. A control unit as claimed in claim 3 wherein the components of the control unit are solid state.

* * * * *